(12) United States Patent
Lyu et al.

(10) Patent No.: US 12,279,147 B2
(45) Date of Patent: Apr. 15, 2025

(54) WIRELESS COMMUNICATION METHOD AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/409,662

(22) Filed: Jan. 10, 2024

(65) Prior Publication Data
US 2024/0244472 A1 Jul. 18, 2024

Related U.S. Application Data

(63) Continuation of application No. PCT/CN2023/078677, filed on Feb. 28, 2023.

(30) Foreign Application Priority Data

Jan. 12, 2023 (CN) .......................... 202310067897.9

(51) Int. Cl.
*H04W 28/02* (2009.01)
*H04L 1/1812* (2023.01)
(Continued)

(52) U.S. Cl.
CPC ....... *H04W 28/0215* (2013.01); *H04L 1/1812* (2013.01); *H04L 5/0048* (2013.01); *H04W 72/1268* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2010/0079244 A1* | 4/2010 | Cao ........................ | H04W 68/00 340/7.2 |
| 2014/0213237 A1* | 7/2014 | Yang ....................... | H04L 67/34 455/418 |

(Continued)

FOREIGN PATENT DOCUMENTS

| CN | 113518435 | | 10/2021 |
|---|---|---|---|
| CN | 114642049 | * | 6/2022 |

(Continued)

OTHER PUBLICATIONS

3GPP TS 38.321 V16.10.0, "3rd Generation Partnership Project; Technical Specification Group Radio Access Network; NR; Medium Access Control (MAC) protocol specification (Release 16)," Sep. 2022, 159 pages.

(Continued)

*Primary Examiner* — Andre Tacdiran
(74) *Attorney, Agent, or Firm* — Fish & Richardson P.C.

(57) ABSTRACT

Disclosed are a wireless communication method and apparatus. One example method includes: receiving, by a terminal device, a first message in a random access procedure; and performing, by the terminal device, retransmission of a first physical uplink control channel (PUCCH) based on first information, wherein the first PUCCH carries feedback information corresponding to the first message, wherein the first information indicates whether the terminal device has a capability of repeatedly transmitting the first PUCCH.

13 Claims, 3 Drawing Sheets

(51) Int. Cl.
*H04L 5/00* (2006.01)
*H04W 72/1268* (2023.01)
*H04W 72/51* (2023.01)

(56) References Cited

U.S. PATENT DOCUMENTS

| | | | | |
|---|---|---|---|---|
| 2015/0365868 | A1* | 12/2015 | Chang | H04W 48/06 |
| | | | | 370/230 |
| 2019/0045552 | A1* | 2/2019 | Blankenship | H04L 1/08 |
| 2019/0230683 | A1* | 7/2019 | Akkarakaran | H04W 72/1268 |
| 2019/0306841 | A1* | 10/2019 | Huang | H04L 5/0055 |
| 2019/0377894 | A1* | 12/2019 | Jang | G06F 3/011 |
| 2020/0177319 | A1* | 6/2020 | Cariou | H04L 1/0008 |
| 2020/0220694 | A1* | 7/2020 | Khoryaev | H04W 28/04 |
| 2021/0037603 | A1* | 2/2021 | Li | H04L 1/1819 |
| 2021/0100004 | A1* | 4/2021 | Yang | H04W 72/21 |
| 2022/0131656 | A1* | 4/2022 | Lee | H04L 1/1854 |
| 2022/0132535 | A1* | 4/2022 | Lee | H04L 1/1854 |
| 2022/0239417 | A1* | 7/2022 | Cheng | H04L 1/1896 |
| 2022/0240163 | A1* | 7/2022 | Choi | H04W 72/04 |
| 2023/0050960 | A1* | 2/2023 | Abedini | H04W 8/08 |
| 2023/0083499 | A1* | 3/2023 | Shin | H04W 72/21 |
| | | | | 370/329 |
| 2023/0156804 | A1* | 5/2023 | Ye | H04B 7/18563 |
| | | | | 370/329 |
| 2023/0308217 | A1* | 9/2023 | Dimou | H04L 1/1812 |
| 2024/0049235 | A1* | 2/2024 | Lim | H04W 72/21 |
| 2024/0057088 | A1* | 2/2024 | Matsumura | H04L 1/1854 |
| 2024/0172222 | A1* | 5/2024 | Tang | H04L 5/0053 |

FOREIGN PATENT DOCUMENTS

| | | | |
|---|---|---|---|
| CN | 115066964 | | 9/2022 |
| CN | 115087125 | | 9/2022 |
| CN | 110944392 | * | 12/2023 |
| WO | WO2020069103 | * | 4/2020 |
| WO | WO2022002165 | * | 1/2022 |
| WO | WO 2022077983 | | 4/2022 |

OTHER PUBLICATIONS

International Search Report and Written Opinion in International Appln. No. PCT/CN2023/078677, mailed on Oct. 2, 2023, 17 pages (with English machine translation).

* cited by examiner

WIRELESS COMMUNICATION METHOD AND APPARATUS

CROSS-REFERENCE TO RELATED APPLICATIONS

The present application is a continuation of PCT Patent Application No. PCT/CN2023/078677, filed on Feb. 28, 2023, which claims priority to Chinese Patent Application No. 202310067897.9, filed on Jan. 12, 2023. All of the aforementioned applications are incorporated herein by reference in their entireties.

TECHNICAL FIELD

The present application relates to the technical field of communications, and more specifically, to a wireless communication method and apparatus.

BACKGROUND

Some communications systems (such as, a non-terrestrial network (NTN) system) have a relatively large transmission delay. In a random access procedure of such communications systems, a terminal device may improve uplink coverage by means of retransmission. For example, the terminal device may ensure a success rate of random access by repeatedly transmitting a physical uplink control channel (PUCCH) carrying feedback information of message 4.

However, in a random access procedure, when a network device configures a resource for retransmission of a PUCCH for a terminal device, network resource waste may be caused.

SUMMARY

Embodiments of the present application provide a wireless communication method and apparatus. Various aspects of the embodiments of the present application are described below.

According to a first aspect, a wireless communication method is provided, and the method includes: receiving, by a terminal device, a first message in a random access procedure; and performing, by the terminal device, retransmission of a first PUCCH based on first indication information of a network device, where the first PUCCH is used to carry feedback information corresponding to the first message. The first indication information is determined based on first information, and the first information is used to indicate whether the terminal device has a capability of repeatedly transmitting the first PUCCH.

According to a second aspect, a wireless communication method is provided, and the method includes: sending, by a network device, a first message in a random access procedure; and receiving, by the network device, a first PUCCH repeatedly transmitted by a terminal device based on first indication information of the network device, where the first PUCCH is used to carry feedback information corresponding to the first message. The first indication information is determined based on first information, and the first information is used to indicate whether the terminal device has a capability of repeatedly transmitting the first PUCCH.

According to a third aspect, a wireless communications apparatus is provided, where the apparatus is a terminal device, and the terminal device includes: a receiving unit, configured to receive a first message in a random access procedure; and a sending unit, configured to perform retransmission of a first PUCCH based on first indication information of a network device, where the first PUCCH is used to carry feedback information corresponding to the first message. The first indication information is determined based on first information, and the first information is used to indicate whether the terminal device has a capability of repeatedly transmitting the first PUCCH.

According to a fourth aspect, a wireless communications apparatus is provided, where the apparatus is a network device, and the network device includes: a sending unit, configured to send a first message in a random access procedure; and a receiving unit, configured to receive a first PUCCH repeatedly transmitted by a terminal device based on first indication information of the network device, where the first PUCCH is used to carry feedback information corresponding to the first message. The first indication information is determined based on first information, and the first information is used to indicate whether the terminal device has a capability of repeatedly transmitting the first PUCCH.

According to a fifth aspect, a communications apparatus is provided, including a memory and a processor, where the memory is configured to store a program, and the processor is configured to invoke the program in the memory to perform the method according to the first aspect or the second aspect.

According to a sixth aspect, an apparatus is provided, the apparatus including a processor configured to invoke a program from a memory to perform the method according to the first aspect or the second aspect.

According to a seventh aspect, a chip is provided, the chip including a processor configured to invoke a program from a memory to cause a device installed with the chip to perform the method according to the first aspect or the second aspect.

According to an eighth aspect, a computer-readable storage medium is provided, the computer-readable storage medium storing a program that causes a computer to perform the method according to the first aspect or the second aspect.

According to a ninth aspect, a computer program product is provided, the computer program product including a program that causes a computer to perform the method according to the first aspect or the second aspect.

According to a tenth aspect, a computer program is provided, where the computer program causes a computer to perform the method according to the first aspect or the second aspect.

According to the embodiments of the present application, a terminal device performs retransmission of a first PUCCH based on first indication information of a network device. The first indication information is related to whether the terminal device has a capability of repeatedly transmitting the first PUCCH. It may be learned that, in the embodiments of the present application, when determining the first indication information, the network device considers capability information of the terminal device, thereby helping reduce network resource waste.

DETAILED DESCRIPTION OF THE EMBODIMENTS

Figure 1:
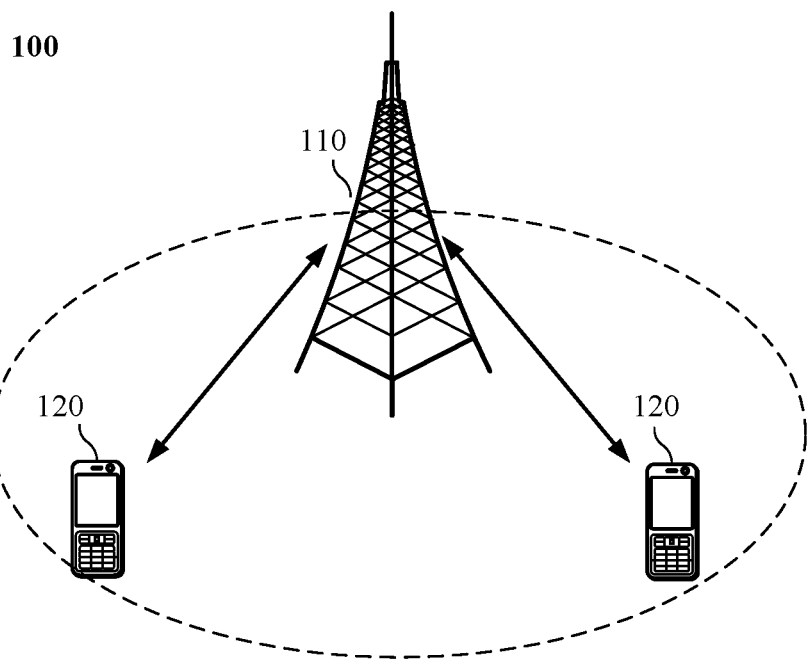
FIG. 1 shows a wireless communications system to which an embodiment of the present application is applied.

The following describes the technical solutions in the embodiments of the present application with reference to the accompanying drawings in the embodiments of the present application. Apparently, the described embodiments are some rather than all of the embodiments of the present application. For the embodiments of the present application, all other embodiments obtained by a person of ordinary skill in the art without creative efforts fall within the protection scope of the present application.

The embodiments of the present application may be applied to various communications systems. For example, the embodiments of the present application may be applied to a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, an NTN system, a universal mobile telecommunications system (UMTS), a wireless local area network (WLAN), wireless fidelity (Wi-Fi), and a 5th generation (5G) communications system. The embodiments of the present application may be further applied to another communications system, for example, a future communications system. The future communications system may be, for example, a 6th generation (6G) mobile communications system, or a satellite communications system.

Conventional communications systems support a limited number of connections and are also easy to implement. However, with the development of communications technologies, a communications system may support not only conventional cellular communication but also one or more types of communication in another type. For example, the communications system may support one or more types of the following communication: device-to-device (D2D) communication, machine-to-machine (M2M) communication, machine-type communications (MTC), vehicle-to-vehicle (V2V) communication, vehicle-to-everything (V2X) communication, and the like. The embodiments of the present application may also be applied to a communications system that supports the foregoing communication manners.

A communications system in the embodiments of the present application may be applied to a carrier aggregation (CA) scenario, a dual connectivity (DC) scenario, or a standalone (SA) networking scenario.

The communications system in the embodiments of the present application may be applied to an unlicensed spectrum. The unlicensed spectrum may also be considered as a shared spectrum. Alternatively, the communications system in the embodiments of the present application may be applied to a licensed spectrum. The licensed spectrum may also be considered as a dedicated spectrum.

The embodiments of the present application may be applied to a terrestrial network (TN) system, or may be applied to an NTN system. For example, the NTN system may include a 4G-based NTN system, an NR-based NTN system, an internet of things (IoT)-based NTN system, and a narrow band-internet of things (NB-IoT)-based NTN system.

The communications system may include one or more terminal devices. The terminal device in the embodiments of the present application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system (such as an NR system), a terminal device in a future evolved public land mobile network (PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone, a tablet computer (pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, or a satellite.

In addition to the terminal device, the communications system may further include one or more network devices. The network device in the embodiments of the present application may be a device for communicating with the terminal device. The network device may also be referred to as an access network device or a wireless access network device. The network device may be, for example, a base station. The network device in the embodiments of the present application may be a radio access network (RAN)

node (or device) that connects the terminal device to a wireless network. The base station may broadly cover various names in the following, or may be interchangeable with one of the following names, for example, a NodeB, an evolved NodeB (eNB), a next generation NodeB (gNB), a relay station, an access point, a transmitting and receiving point (TRP), a transmitting point (TP), a master MeNB, a secondary SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and M2M communications, a network-side device in a 6G network, a device that functions as a base station in a future communications system, or the like. The base station may support networks of the same or different access technologies. A specific technology and specific device form used by the network device are not limited in the embodiments of the present application.

The base station may be fixed or mobile. For example, a helicopter or an unmanned aerial vehicle may be configured to act as a mobile base station, and one or more cells may move according to the position of the mobile base station. In other examples, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

As an example rather than limitation, in the embodiments of the present application, the network device may have a mobile feature, for example, the network device may be a movable device. In some embodiments of the present application, the network device may be a satellite, or a balloon station. In some embodiments of the present application, the network device may alternatively be a base station located on land, water, or the like.

In the embodiment of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include a metro cell, a micro cell, a pico cell, a femto cell, or the like. These small cells feature small coverage and low transmit power, and are suitable for providing a high-speed data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device located within the coverage.

FIG. 1 shows an example in which there are one network device and two terminal devices. In some embodiments of the present application, the communications system 100 may include a plurality of network devices and another number of terminal devices may be included within a coverage area of each network device, which is not limited in embodiments of the present application.

In the embodiment of the present application, the wireless communications system shown in FIG. 1 may further include another network entity such as a mobility management entity (MME) or an access and mobility management function (AMF), which is not limited in embodiments of the present application.

It should be understood that a device having a communication function in a network/system in the embodiments of the present application may be referred to as a communications device. The communications system 100 shown in FIG. 1 is used as an example. A communications device may include a network device 110 and a terminal device 120 having a communication function, and the network device 110 and the terminal device 120 may be specific devices described above, and details are not described herein. The communications device may further include other devices in the communications system 100, such as a network controller, a mobility management entity, and other network entities, which is not limited in embodiments of the present application.

For ease of understanding, some related technical knowledge related to embodiments of the present application is first introduced. The following related technologies, as optional solutions, may be randomly combined with the technical solutions of the embodiments of the present application, all of which fall within the protection scope of the embodiments of the present application. The embodiments of the present application include at least part of the following content.

With the development of mobile communications technologies, coverage problems are gradually emerging and widely concerned in the industry. A 5G network system is used as an example. Based on comparison with a 4G network, it may be learned that coverage problems are mainly caused by the following two reasons. First, an operating frequency band in a 5G system is higher than that in a 4G system. For example, the 5G system includes a frequency band of 3.5 GHz in frequency range 1 (FR1) and a millimeter wave frequency band of 26 GHz in FR2. FR1 refers to a sub-6 GHz band in 5G, and FR2 refers to a millimeter wave frequency band in 5G. A path loss in a high frequency band is higher than that in a low frequency band. For example, a path loss in a frequency band of 3.5 GHz is 6-7 dB higher than that of 1.8 GHz, and indoor coverage of 3.5 GHz is 5-10 dB weaker than that of 1.8 GHz. Second, the 5G system aims to provide a higher user experience rate and a higher cell edge rate, imposing a higher requirement on coverage performance. Therefore, the 5G network faces more challenges in terms of coverage than the 4G network, especially for outdoor-to-indoor coverage scenarios.

Retransmission is usually used in a wireless communications system to enhance coverage performance. Retransmission is a very effective solution for improving signal transmission quality. Repetition of a signal can improve detection and decoding performance of a receiver. For example, in a random access procedure of an NR system, a conflict occurred when a plurality of terminal devices in a cell simultaneously send a same preamble may be solved by exchanging messages (message 3 and message 4) between a network device and a terminal device. Message 3 is sent by the terminal device to the network device by using an uplink channel. Coverage performance of the message 3 is worse than coverage performance of another channel, which makes it difficult for a terminal device in an area with poor signal coverage quality to access the cell. Thus, the NR system introduces a mechanism for retransmission (multiple transmission) of message 3 to improve coverage performance for message 3. However, in the complete random access procedure, a radio resource control (RRC) connection starts only after a user receives message 4 and transmits hybrid automatic repeat request (HARQ) feedback. Coverage performance of the HARQ feedback also affects a success rate of random access of the terminal device.

Figure 2:
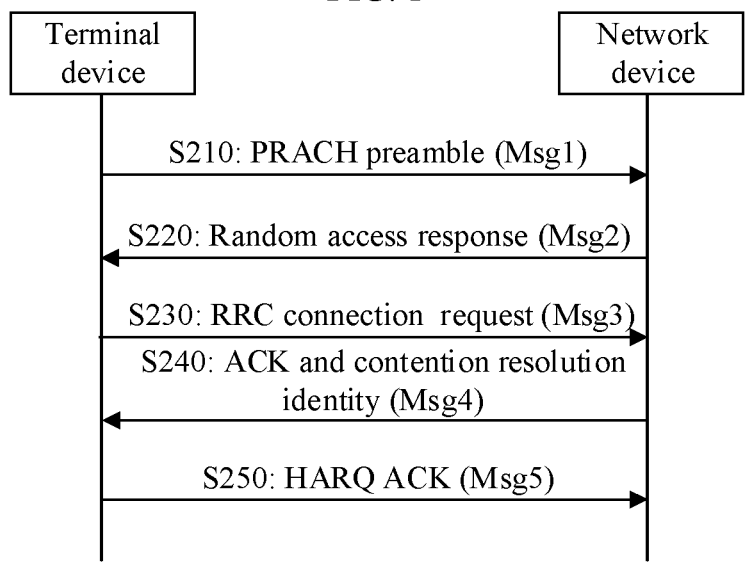
FIG. 2 is a schematic flowchart of a random access procedure.

The following describes a random access procedure in detail with reference to FIG. 2. In a wireless communications system, a terminal device may establish or re-establish a RRC connection to a network device by using a random access procedure.

There are two random access manners: one is contention-based random access (CBRA), and the other is contention-free random access (CFRA). The following describes a main procedure of the random access procedure with reference to FIG. 2.

The random access procedure shown in FIG. 2 includes Step S210 to Step S250. Step S210 to Step 240 form a 4-step random access channel (RACH) procedure.

In Step S210, a terminal device sends message 1 (Msg1) to a network device.

In the 4-step RACH, the terminal device may select an RACH resource and a preamble, and send Msg1 to the network device on the selected resource. The RACH resource is also referred to as a physical random access channel (PRACH) resource. Msg1 includes the preamble of the PRACH resource.

The network device may send configuration information of the PRACH to the terminal device in a broadcast mode. The configuration information of the PRACH may include configuration information of a time-frequency resource of the PRACH and configuration information of a start preamble root sequence. Based on the configuration information of the PRACH, a preamble or a preamble set corresponding to the network device may be determined.

The network device may notify, in advance by using a system broadcast (for example, an initial access scenario) or an RRC message (for example, an HO or SN Addition scenario), the terminal device of an available random access preamble. The preamble may also be referred to as a preamble sequence. The preambles support four long sequence preambles with a length of 839 and nine short sequence preambles with a length of 139, and a preamble length is indicated by a higher-layer parameter prach-RootSequenceIndex. In FR1, a long sequence and short sequences with subcarrier spacing of 15 KHz and 30 KHz are supported. In FR2, only short sequences with subcarrier spacing of 60 KHz and 120 KHz are supported. Each cell has 64 available preambles, and the terminal device may select one preamble (or one preamble is specified by the network device) to be uploaded on the PRACH.

Figure 3:
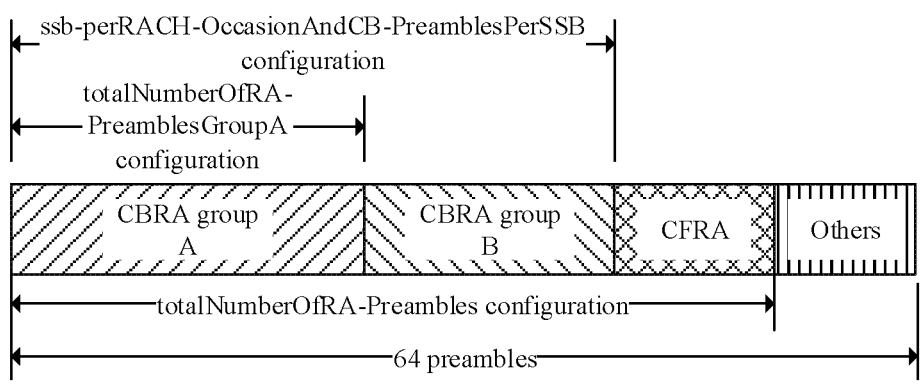
FIG. 3 is a schematic structural diagram of preambles in Step S210.

For ease of understanding, the following description is made with reference to a schematic diagram of preambles shown in FIG. 3. FIG. 3 is a mapping grouping diagram of preambles obtained when a configuration parameter SSB-perRACHOfRA-Occasion is less than or equal to 1. As shown in FIG. 3, 64 preambles may be divided into two parts: one part is preambles indicated by totalNumberOfRA-Preambles and used for CBRA and CFRA and a higher capability or another requirement of a terminal device; and the other part is other preambles different from totalNumberOfRA-Preambles, which are used for another purpose. If totalNumberOfRA-Preambles do not only indicate a specific number of preambles, 64 preambles are all used for CBRA and CFRA.

Still referring to FIG. 3, preambles for CBRA are classified into two groups, which are respectively a CBRA group A and a CBRA group B. The CBRA Group A is configured by using totalNumberOfRA-PreambleGroupA. The CBRA Group B does not necessarily exist. A parameter of the CBRA Group B is configured by using ssb-perRACH-OccasionAndCB-PreamblesPerSSB. For configuration of the CBRA parameter, a network device may send these configurations by using RACH-ConfigCommon (BWP-Common in a system information block 1 (SIB1)). A CFRA parameter may be configured by the network device by using RACH-ConfigDedicated.

The terminal device may select a preamble based on a specific policy. Since a preamble is shared by a plurality of terminal devices, there is a case of conflict in which a plurality of terminal devices select a same preamble. To solve the conflict, the network device may use a subsequent resolution mechanism to handle the conflict.

In Step S220, the network device sends message 2 (Msg2) to the terminal device.

Msg2 is also referred to as a random access response (RAR). Msg2 may be carried by using a physical downlink control channel (PDCCH) and a physical downlink shared channel (PDSCH).

After sending a preamble, the terminal device monitors the PDCCH in an RAR time window. The terminal device receives, by monitoring the PDCCH, an RAR scheduled by using the PDCCH scrambled by a random access-radio network temporary identifier (RA-RNTI). The RA-RNTI is related to a time-frequency resource of the RACH used by the terminal device to send Msg1. After receiving the PDCCH, the terminal device may decode the PDCCH by using the RA-RNTI.

After successfully receiving the PDCCH, the terminal device can obtain a PDSCH scheduled by the PDCCH, where the PDSCH includes the RAR. The RAR may include a plurality of pieces of information. For example, a sub-header of the RAR may include a fallback indication for indicating a fallback time for retransmission of Msg1. A random access preamble identifier in the RAR indicates a preamble index received by the network device in response. A load in the RAR may include a timing advance group (TAG), and the TAG may be configured to adjust uplink timing. The RAR may further include an UL grant, which is used to schedule an uplink resource indication of message 3. The RAR may further include a temporary cell-radio network temporary identifier (TC-RNTI), and an initially accessed terminal device may use the TC-RNTI to decode a PDCCH of message 4.

A preamble index in the RAR may be used by the terminal device to determine whether the receiving succeeds. If the preamble index in the RAR received by the terminal device is the same as a preamble index sent by the terminal device, the terminal device may consider that the RAR is successfully received. After successfully receiving the RAR, the terminal device may stop monitoring the RAR and perform Step S230 based on a grant indication carried in the RAR.

If the terminal device does not receive the RAR in a time window of a random access response, or fails to verify the RAR, it indicates that the response fails. In this case, if a quantity of random access attempts of the terminal device is less than an upper limit (for example, 10 times), the terminal device may continue to attempt to perform random access. If the quantity of attempts is greater than the upper limit, it indicates that the random access fails.

Step S230: The terminal device sends message 3 (Msg3) to the network device.

The terminal device may send Msg3 on an uplink grant scheduled by the network device. Msg3 may also be referred to as an RRC connection request message.

After receiving the preamble in Step S210, the network device configures a physical uplink shared channel (PUSCH) resource of Msg3 by using an RAR message. Therefore, Msg3 is transmitted on an uplink shared channel (UL-SCH), HARQ is used, and a PDCCH is scrambled by using TC-RNTI indicated by the RAR. Retransmission of Msg3 is scheduled by using a downlink control information (DCI) format, namely, DCI.

Msg3 includes a unique identity (ID) of each terminal device, and the identity is used for contention resolution in Step S240. Msg3 may be used to notify the network device of an event that triggers the random access procedure. In different scenarios, Msg3 sent by the terminal device is different. For example, for an initial access scenario in which an RRC connection is set up, the terminal device may send an RRC connection setup request by using Msg3. For another example, for an RRC connection reestablishment scenario, the terminal device may send an RRC reestablishment request message by using Msg3. For another example, in a handover (HO) scenario, if the terminal device accesses a target cell and does not have a dedicated preamble in a handover process, contention-based random access may be triggered. The terminal device may send an RRC handover acknowledgment message and a C-RNTI by using Msg3.

In Step S240, the network device sends message 4 (Msg4) to the terminal device.

After receiving Msg3, the network device schedules Msg4 by using DCI scrambled by the TC-RNTI. Msg4 may include a contention resolution identity (CRID) and acknowledge (ACK) information. Msg4 may further carry an RRC configuration message (RRCSetup). Msg4 may be carried by using a PDCCH and a PDSCH.

If the terminal device carries a C-RNTI in Msg3, for example, in an RRC reestablishment procedure, Msg4 is scheduled by using a PDCCH scrambled by using the C-RNTI. Correspondingly, the terminal device may decode the PDCCH by using the C-RNTI in Msg3 to obtain Msg4. If the terminal device does not carry a C-RNTI in Msg3, for example, in initial access, Msg4 may be scheduled by using a PDCCH scrambled by using a TC-RNTI. Correspondingly, the terminal device may decode the PDCCH by using the TC-RNTI in Msg2 to obtain Msg4.

When a UE contention resolution identity MAC control element included in Msg4 and successfully decoded by the terminal device matches a UE contention resolution identity sent by Msg3, the terminal device deems that random access is successful. The terminal device sets the TC-RNTI carried in the RAR to C-RNTI, that is, four steps of random access are completed.

In Step S250, the terminal device sends Message 5 (Msg5) to the network device.

Msg5 may include HARQ ACK information for Msg4, and may further include information related to an RRC connection. Msg5 may be carried in a PUCCH. After Msg4 is sent in the random access procedure, the terminal device feeds back, by using the PUCCH, whether Msg4 is correctly received (Msg5).

In short, the terminal device selects a preamble from a preamble pool as a temporary identity of the terminal device, and sends a random access request to the network device. In a cell, each preamble is associated with one preamble index. If the terminal device receives the RAR and the RAR includes a preamble index corresponding to a preamble selected by the terminal device, the terminal device deems that the network device responds to the request of the terminal device. Before Msg5 is sent, there are two interactions between the terminal device and the network device, and four messages are successively referred to as Msg1 (a random access preamble, uplink), Msg2 (a random access response, downlink), Msg3 (schedule transmission, uplink), and Msg4 (a contention resolution, downlink). If the terminal device fails to receive Msg2 or fails to receive Msg4, it indicates that the random access fails. An RRC connection starts after the terminal device receives Msg4 and sends HARQ feedback in Msg5.

In the foregoing random access procedure, messages sent by using an uplink channel include Msg1, Msg3, and Msg5. In some scenarios, coverage performance of these uplink communications is poor. For example, in an initial access phase, the terminal device cannot perform a complex channel measurement or beam training procedure, and thus coverage performance of these uplink communications is inferior to that of a PDSCH or a PUSCH in a connected state. Msg5 includes ACK feedback of Msg4, and whether Msg5 is successfully transmitted directly affects setup or reestablishment of an RRC connection. Therefore, to improve uplink coverage, a PUCCH retransmission may be introduced to implement the ACK feedback of Msg4.

A relatively large transmission delay exists in some communications systems, and time for an entire random access procedure increases. For these systems, successful access of the terminal device to the system is an important performance indicator. For example, a round trip time (RTT) in an NTN network is very long, some satellite orbits are mobile, and a message transmission time is relatively long. Therefore, it is very important to ensure a success rate of random access.

To ensure a success rate of random access, coverage performance of data transmission may be increased. For example, in an NTN network, whether a terminal device can access the NTN network depends on whether Msg4 is successfully transmitted. ACK feedback (Msg5) of Msg4 is carried in a PUCCH. To access the NTN network, a manner of retransmission of a PUCCH may be used to improve a success rate of accessing an NTN cell by the terminal device. In other words, a success rate of random access is ensured by supporting retransmission of the PUCCH.

In the RRC connected state, scheduling of a PUCCH resource may be dynamically indicated by the DCI to the terminal device. Each terminal device is configured with PUCCH resources and a number of retransmissions for each PUCCH resource. Therefore, based on a dynamic indication of a PUCCH resource, the network device can indicate retransmissions in a same PUCCH to the terminal device. However, the resource scheduling mechanism is unavailable before an RRC configuration is established. An RRC connection starts after the terminal device sends the ACK feedback of Msg4. Therefore, a mechanism for indicating that repetition transmission of ACK on a PUCCH performed before the RRC configuration is established needs to be introduced.

However, retransmission of a PUCCH is limited by a capability of the terminal device. In a random access procedure, the terminal device does not report capability information of the terminal device to the network device. Therefore, the network device does not learn whether the terminal device supports PUCCH repetition. This means that if the network device schedules retransmission of Msg5 to the terminal device that does not support the feature, not only performance of the PUCCH channel is degraded, but also network resources are wasted.

In view of this, an embodiment of the present application provides a wireless communication method. According to this method, capability auxiliary information related to that the terminal device supports retransmission of a PUCCH is introduced. The network device may determine a number of retransmissions and retransmission resources for the PUCCH based on the information, so as to optimize scheduling decisions of the network device and system performance. The following describes in detail the wireless communication method according to this embodiment of the present application with reference to FIG. 4.

Figure 4:
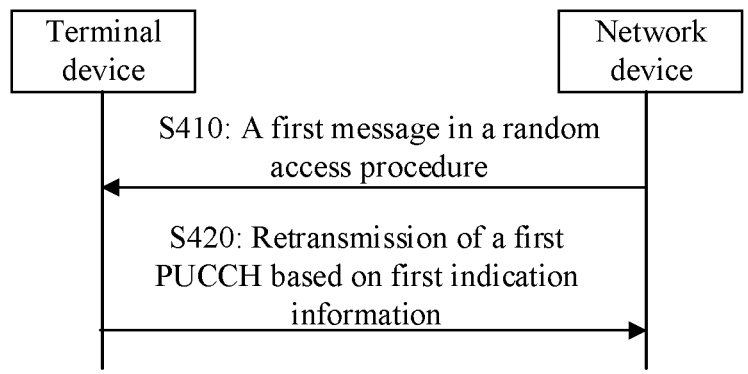
FIG. 4 is a schematic flowchart of a wireless communication method according to an embodiment of the present application.

The method shown in FIG. 4 is described from a perspective of interaction between a terminal device and a network device. The terminal device and the network device may be devices that perform communication in any one of the foregoing communications systems. For example, the terminal device may be a device that establishes an RRC connection to the network device in a random access procedure.

In some embodiments, the terminal device and the network device may be communications devices in an NTN system. For example, the network device may be a satellite, in the NTN network, corresponding to a quasi-Earth fixed cell or a quasi-Earth moving cell. For example, the terminal device may be a terrestrial communications device that requests to access the NTN network.

The terminal device may perform random access in a plurality of states. In some embodiments, the terminal device may perform initial access in an RRC idle state (RRC_IDLE). In some embodiments, the terminal device may resume access in an RRC inactive state (RRC_INACTIVE).

The terminal device and the network device may be connected in a plurality of application scenarios. The plurality of application scenarios are, for example, an RRC connection reestablishment scenario, another system information (SI) request scenario, and a handover scenario. The plurality of application scenarios may alternatively be an uplink out-of-synchronization scenario, an uplink data arrival scenario, and a downlink data arrival scenario.

Referring to FIG. 4, in Step S410, the network device sends a first message in a random access procedure to the terminal device. Correspondingly, the terminal device receives the first message.

The random access procedure may be the CBRA process or the CFRA process described above, or may be random access of a terminal device in different states and a plurality of application scenarios, which is not limited herein.

The first message may be a message exchanged before the network device and the terminal device establish or reestablish an RRC connection in the random access procedure. In some embodiments, the first message may be Msg4 or Msg2 shown in FIG. 2 and sent by the network device to the terminal device. In some embodiments, the first message may be an RAR sent by the network device based on a contention-free random access method.

In Step S420, the terminal device performs retransmission of the first PUCCH based on first indication information of the network device. The first PUCCH is used to carry feedback information corresponding to the first message.

The first indication information of the network device may be determined based on first information. The first information may indicate whether the terminal device has a capability of repeatedly transmitting the first PUCCH. In some embodiments, if the terminal device supports retransmission of a PUCCH in an RRC non-connected state, the terminal device may notify, by using the first information, a network side that the terminal device supports retransmission of Msg5. For example, in uplink transmission of a random access procedure, the terminal device may notify, by using the first information or association information of the first information, the network side whether the terminal device supports retransmission of PUCCH HARQ of Msg4.

The network device may obtain the first information in plurality of manners, that is, the first information may be associated with a plurality of types of information. Details are described later with reference to FIG. 5 and FIG. 6.

Whether the terminal device has a capability of repeatedly transmitting a first PUCCH may mean whether the terminal device supports retransmission of a PUCCH in an RRC non-connected state. In other words, when a network device cannot configure a dedicated resource of the PUCCH for the terminal device by using DCI, whether the terminal device may perform retransmission of the PUCCH.

In some embodiments, if the first information indicates that the terminal device has the capability of repeatedly transmitting the first PUCCH, the network device may schedule a retransmission resource for the terminal device, so as to improve a success rate of random access of the terminal device. The retransmission resource may be used to avoid a case that the terminal device initiates a random access procedure again because of a single transmission failure of Msg5. In a possible implementation, the first indication information of the network device may be used to notify, through downlink transmission, the terminal device of a retransmission resource and a number of retransmissions.

In some embodiments, if the first information indicates that the terminal device does not have the capability, the network device does not allocate a retransmission resource to the terminal device, and does not wait for receiving, thereby reducing resource waste. In a possible implementation, the first indication information of the network device may indicate that the number of retransmissions is 1, and also indicate a resource for once transmission. In another possible implementation, the network device may further not transmit first indication information.

The first PUCCH may be an uplink control channel transmitted after the terminal device receives a first message. In some embodiments, the first PUCCH may be an uplink control channel for sending Msg3 or Msg5 when the terminal device performs initial access.

The first PUCCH may carry feedback information corresponding to the first message. The feedback information may be HARQ feedback of the first message, or may be other information for determining whether to receive the first message. For example, after receiving Msg4, the terminal device may transmit HARQ ACK for Msg4 by using the first PUCCH. For another example, after receiving Msg2, the terminal device may transmit, by using the first PUCCH, acknowledgment information related to an RAR.

In some embodiments, the first PUCCH may further carry other related information of random access. For example, the first PUCCH may carry information, in Msg5, related to an RRC connection.

It may be learned from FIG. 4 that the network device in this embodiment of the present application may learn, by using the first information, whether the terminal device supports retransmission of the first PUCCH. When the first PUCCH carries Msg5, a network side may learn whether the terminal device has a capability of repeatedly transmitting Msg5. The terminal device notifies the network side of the information before the network side allocates a retransmission resource, so as to avoid waiting on the network side, or avoid the terminal device from initiating a random access procedure again.

As mentioned above, the first information may be associated with one or more information. By means of association information, a request for a retransmission capability may be implemented. The association information may be a first preamble selected by the terminal device, may be channel quality detected by the terminal device, may be capability information of the terminal device recorded by the network device, or may be a port number for the terminal device to send a demodulation reference signal (DMRS).

In some embodiments, the first information may be associated with the first preamble selected by the terminal device. As described above, the network device may configure a selectable preamble for the terminal device, and notify the terminal device by using broadcast information or RRC information. For example, the network device may send, by using the broadcast information, RACH-Config-Common to notify the terminal device of grouping of preambles.

The terminal device may send the selected preamble in Msg1 in the random access procedure. In some embodiments, the terminal device selects a first preamble before Step S410 in FIG. 4, and then sends the first preamble. The first preamble is a preamble, configured by the network device, in a first preamble group, and the first preamble group may be used to indicate that the terminal device has a capability of repeatedly transmitting the first PUCCH. In other words, to enable the network device to learn capability information of the terminal device, the network device may introduce a new preamble set, namely, the first preamble group, into preamble configuration. If the terminal device selects a preamble in the first preamble group, it indicates that the terminal device supports retransmission of Msg5.

The first preamble group may be determined based on one or more preambles sent by the network device. In some embodiments, the first preamble group may be determined based on a plurality of preambles corresponding to CBRA and sent by the network device. In some embodiments, the first preamble group may be determined based on a plurality of preambles corresponding to CFRA and sent by the network device. In some embodiments, the first preamble group may be determined based on a plurality of preambles sent by the network device and being different from a preamble corresponding to CBRA or CFRA. In other words, the first preamble group may be determined based on another preamble (other preambles) in a preamble sequence structure.

Figure 5:
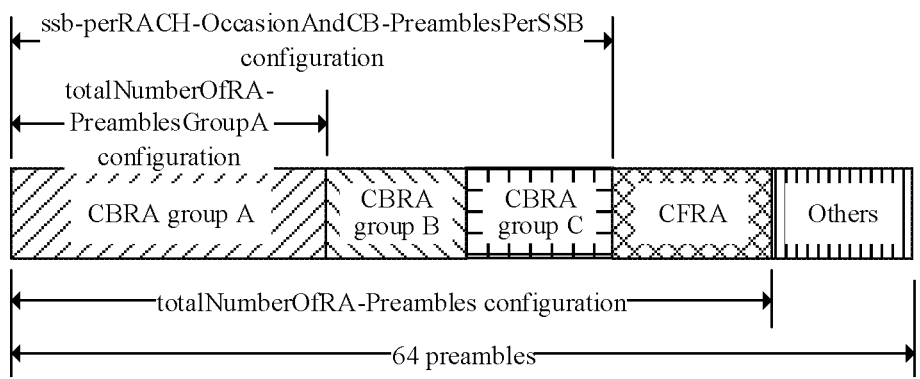
FIG. 5 is a schematic structural diagram of preambles in a possible implementation according to an embodiment of the present application.
Figure 6:
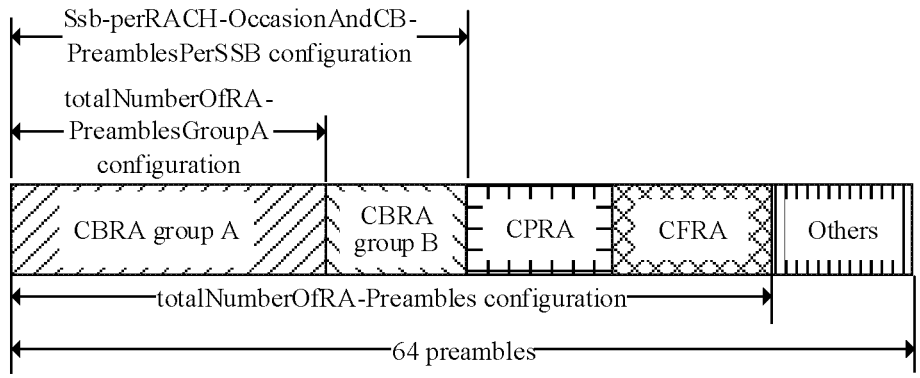
FIG. 6 is a schematic structural diagram of preambles in another possible implementation according to an embodiment of the present application.

For ease of understanding, the following separately describes several manners of determining the first preamble group with reference to the embodiments illustrated in FIG. 5 and FIG. 6. In FIG. 5, the first preamble group is determined based on a preamble used by the CBRA. In FIG. 6, the first preamble group is determined based on CFRA or another preamble.

Referring to FIG. 5, the network device groups a plurality of preambles used by the CBRA, which are respectively a CBRA group A, a CBRA group B, and a CBRA group C. Compared with FIG. 3, the added group C is the first preamble group mentioned above.

In some embodiments, the group A and the group B may maintain an original function, and the added group C is intended for a terminal device that supports retransmission of a random access message, for example, retransmission of Msg3 or Msg5. If the terminal device itself has a retransmission capability, when initiating random access, the terminal device selects a preamble in the group C, for example, a terminal device adapted to the R18.

In some embodiments, if the plurality of preambles corresponding to CBRA include a preamble group A and a preamble group B, the first preamble group may be determined based on the preamble group B. In a possible implementation, the group A may maintain an original function, and the group C may be a part of the group B, and is used by a terminal device that supports retransmission of a random access message, for example, retransmission of Msg3 or Msg5. If the terminal device itself has a retransmission capability, a preamble of the group C is selected, for example, a terminal device adapted to the R18. In another possible implementation, the group C may be the group B, that is, a preamble selection that the terminal device has a retransmission capability is added to a function of the original preamble group B.

In some embodiments, if the plurality of preamble corresponding to the CBRA includes only the preamble group A, and does not include the preamble group B, the first preamble group may be determined based on the preamble group A. For example, when there is no group B, a system may directly divide preambles used by the CBRA into a preamble group A and a preamble group C. The preamble group C may alternatively be a part of the original group A.

The terminal device may select a preamble in the preamble group A, the preamble group B, or the preamble group C based on capability information of the terminal device. If the terminal device completes exchange of Msg1/Msg2/Msg3 in a random access procedure and access fails, a preamble used when the terminal device attempts to access again should be in a same preamble group with a preamble used in the first transmission. For example, the terminal device selects a first preamble in the group C. If Step S230 fails, the terminal device further selects a preamble in the group C when initiating random access again.

As mentioned above, a delay in the NTN system is relatively long. When the NTN system uses the preamble structure shown in FIG. 5, preambles in the group C may be insufficient. For example, if more and more terminal devices adapted to the R18 access an NTN area, or more and more terminal devices support retransmission of Msg3 or Msg5, preambles in the group C may not be enough.

In a possible implementation, when sending, next time by using broadcast information, a preamble used for selection, the network device may increase a number of preambles in the group C by decreasing a size of the group A or the group B. For example, if there is a group B, some preambles in the group B may be assigned to the group C, that is, the group B may be periodically reduced. For another example, if there is no group B, and the group C is insufficient, a preamble in the group A may be transferred to the group C. For another example, a threshold Target_preambleA indicating a minimum quantity of preambles in the group A in a cell may be set for the group A.

As shown in FIG. 5, when the first preamble group is determined based on the preamble used by the CBRA, parameters corresponding to the first preamble group may be configured by using ssb-perRACH-OccasionAndCB-PreamblesPerSSB.

Referring to FIG. 6, the network device may occupy some of other preambles in a preamble set or some preambles used by the CFRA as a first preamble group selected by the terminal device. The first preamble group may also be referred to as contention preamble random access (CPRA) shown in FIG. 6.

In some embodiments, the CPRA may be intended for a terminal device that supports retransmission of a random access message and a terminal device with a higher level capability in a subsequent evolved version, for example, a retransmission capability of Msg3 or Msg5. If the terminal device itself has a retransmission capability, when initiating random access, the terminal device may select a preamble of the CPRA, for example, a terminal device adapted to the R18.

When the first preamble group is determined based on a preamble used by the CFRA or another preamble, a parameter corresponding to the first preamble group may be configured in plurality of manners. For example, the first preamble group may be separately configured, or may be configured according to RACH-ConfigCommon carried in BWP-Common in a SIB, or may be configured according to RACH-ConfigDedicated.

In a possible implementation, when configuring a first preamble group that may indicate capability information of the terminal device, the network device may alternatively perform configuration by using another parameter in the SIB.

In some embodiments, if a number of consecutive failures of random access performed by the terminal device by selecting a first preamble is greater than a first upper limit, the terminal device selects a preamble, sent by the network device, in another preamble group. The first upper limit may be configured by the network device. For example, if the number of consecutive failures of random access performed by the terminal device by selecting a preamble in the group C is n or more, the terminal device selects a preamble in the group A, and discards selection of a preamble from the group C. For example, if the number of consecutive failures of random access performed by the terminal device by selecting a preamble in the CPRA is n or more, the terminal device may select a preamble from the CBRA.

In some embodiments, when the network device allocates a resource block (RB) and a modulation and coding scheme (MCS) to the terminal device, a data volume of Msg3 or Msg5 subsequently sent by the terminal device is not learned by the network device. If too much resources are allocated, resource waste is caused. If too few resources are allocated, insufficient resource is caused. Therefore, when the network device performs group processing on preambles according to FIG. 5 or FIG. 6, preambles in different groups may use different scheduling combinations of RB+MCS. The terminal device provides, by selecting a required preamble, a reference for scheduling performed by the network device.

The preamble structures shown in FIG. 5 and FIG. 6 are used by the terminal device to select a preamble that may indicate a capability of the terminal device. In other words, the first information may be determined based on a first preamble selected by the terminal device. The first information may also be associated with other information.

In some embodiments, the first information may be associated with channel quality detected by the terminal device. The channel quality detected by the terminal device may be channel quality detected by the terminal device in an initial access procedure. The channel quality is, for example, reference signal received power (RSRP).

In a possible implementation, the network device may configure an RSRP threshold and a dedicated preamble resource that are related to PUCCH repetition for the terminal device in the broadcast information. The dedicated preamble resource may be the first preamble group in FIG. 5 or FIG. 6, or may be another specified dedicated resource. If the channel quality detected by the terminal device is lower than a first threshold, the terminal device may select a dedicated preamble resource, namely, a second preamble. The second preamble may be used to request the network device to send the first indication information.

For example, if the RSRP detected by the terminal device in the initial access procedure is less than a set value, the terminal device selects a corresponding preamble and transmits the preamble. After detecting Msg1 by using a random access dedicated resource, the network device may specify a number of retransmissions of Msg5 performed by the terminal device in Msg2. The terminal device may perform retransmission of Msg5 in an indicated uplink available slot.

In some embodiments, the first information may be associated with capability information, recorded by the network device, of the terminal device. The capability information of the terminal device may include whether the terminal device has a capability of repeatedly transmitting a first PUCCH. The network device may send the first indication information during random access other than initial access based on the recorded capability information. In other words, the capability of repeatedly transmitting a first PUCCH is added to the capability information of the terminal device. In an initial access procedure, the terminal device cannot notify the network device of the capability information of the terminal device. Therefore, in the transmission, the network device cannot allocate a retransmission resource for the first PUCCH to the terminal device. However, after a connection is established with the network device, the capability information of the terminal device has already been recorded in the network device. The network device may directly allocate a retransmission resource for the first PUCCH in a next random access procedure.

In a possible implementation, a capability of retransmitting Msg5 may be added to the capability information of the terminal device. When the terminal device performs random access other than the initial random access, the network device may directly send the first indication information. The terminal device may initiate retransmission of Msg5 based on the first indication information.

In some embodiments, the first information may be associated with a port number for the terminal device to send a DMRS. When the network device schedules an uplink resource, indication information of some DMRS port numbers may be configured by using different formats of DCI, or a port number that is different from a default DMRS port number may have specific indication information. These DMRS port numbers may indicate that the terminal device has a capability of repeatedly transmitting the first PUCCH. In other words, the terminal device may notify, by using the DMRS port numbers, the network device that the terminal device has a capability of supporting PUCCH retransmission.

In a possible implementation, when supporting PUCCH retransmission of HARQ-ACK for Msg4, the terminal device may select a corresponding DMRS port to send the DMRS. For example, when the first PUCCH carries Msg5, the terminal device may report a related capability by using a port number of a DMRS in Msg3 when sending Msg3.

In another possible implementation, when supporting PUCCH retransmission of HARQ-ACK for Msg4, the terminal device may select a DMRS port different from that for Msg3 to send the DMRS. The DMRS port number that is different may indicate that the terminal device has a capability of supporting retransmission of the first PUCCH. For example, when the DMRS port number used for Msg3 is 0, a port number for the terminal device to send Msg5 may be a port number 1 that is different from the port number 0.

In some embodiments, the first information may also be associated with other information in Msg3. The terminal device may report, by using Msg3, that the terminal device itself has a capability of supporting PUCCH retransmission. In a possible implementation, the terminal device may indicate, by using a logical channel ID (LCID) in Msg3, that the terminal device supports retransmission of the first PUCCH. For example, a terminal device adapted to the R18 may indicate, by using an LCID codepoint within a range of reserved index values, that the terminal device supports PUCCH retransmission of HARQ-ACK for Msg4. The range of reserved index values for the LCID is, for example, LCID codepoints in a reserved range indicated by the table 6.2.1-2 in TS38.321. The foregoing describes association information of the first information used to determine the first indication information, and the following describes the first indication information in detail.

In some embodiments, the first indication information may include or be used to determine a number of retransmissions of the first PUCCH and a resource for retransmission of the first PUCCH, namely, a number of retransmissions of the first PUCCH and a retransmission resource for the first PUCCH. For example, the first indication information may directly include the number of retransmissions of the first PUCCH and/or the retransmission resource for the first PUCCH. For another example, the first indication information may determine the number of retransmissions of the first PUCCH and/or the retransmission resource for the first PUCCH.

The first indication information may indicate a number of retransmissions or a retransmission resource by using information in Msg2, or a number of retransmissions of a PUCCH and a resource for the PUCCH may be configured for the terminal device in another manner.

The number of retransmissions of the first PUCCH may be related to a plurality of factors. In some embodiments, when a common PUCCH resource is used, the number of retransmissions may be determined based on a size of an available resource. In some embodiments, to allow flexibility of configuration of an NTN network, the number of retransmissions of the first PUCCH may be determined based on a state of a satellite. The state of the satellite may be used to determine whether a cell that the terminal device requests to access is a quasi-Earth fixed cell or a quasi-Earth moving cell. For example, for a quasi-Earth moving cell, the number of retransmissions may be reduced. If the cell is a quasi-Earth fixed cell, the number of retransmissions may be increased.

The number of retransmissions of the first PUCCH may be indicated by using one or more information. The information may directly indicate the number of retransmissions of the first PUCCH, or may be used to determine the number of retransmissions of the first PUCCH in combination with configuration information. The information may be a channel state information (CSI) request bit, an MCS index bit, or a transmit power control (TPC) command bit, sent by the network device, in an uplink grant of an RAR, may be a timing advance command (TAC) sent by the network device, may be a repetition factor configured by the network device by using a SIB, may be a scenario in which the terminal device sends Msg3, may be a downlink assignment index (DAI) bit of DCI sent by the network device, or may be a port number for the terminal device to send a DMRS.

In some embodiments, an MCS bit, a TPC bit, and a CSI request bit in the RAR uplink grant and sent in Msg2 are all reserved bits, and may be used to indicate a number of retransmissions.

In a possible implementation, the network device may indicate a number of times of repeated mapping by using a CSI request bit in the RAR uplink grant in the SIB. For example, when the CSI request bit=1, it may indicate that the repetition number is 4; and when the CSI request bit=0, the bit is a reserved bit, and it indicates that the repetition number is 1 or there is no repetition. For another example, when the CSI request bit=1, it may mean that the repetition number is 8, and when the CSI request bit=0, it means that the repetition number is 1 or there is no repetition.

In a possible implementation, the network device may indicate different repetition times by using two bits in MCS index bits, or may use a same retransmission indication manner as that of Msg3. For Msg3, top 2 bits in an MCS information field are used to indicate a number of retransmissions of Msg3, and remaining bits of the MCS are used to indicate an MCS value. When the first PUCCH carries Msg5, an identifier of the terminal device for supporting retransmission of Msg3 may further represent a number of retransmissions of Msg5.

In a possible implementation, the network device may identify a number of retransmissions of the first PUCCH by using a command bit in a TPC field. If there is no repetition, the terminal device may decode all bits in the TPC field granted in RAR uplink as a TPC command. If repetition is indicated, the terminal device may decode a plurality of bits in the TPC field. The TPC is represented by three bits, and each of the three bits may represent different repetition times and corresponding power values. The number of retransmissions of the first PUCCH may be proportional to or inversely proportional to the power value. For example, a higher number of retransmissions causes a higher transmit power.

For example, when the first PUCCH carries Msg5, the number of retransmissions of Msg5 may be related to a transmit power of Msg3. The terminal device may simultaneously determine the number of retransmissions and the TPC command by decoding the TPC command. The terminal device may send Msg3 based on the TPC command in the interpretation result, and repeatedly transmit Msg5 according to the number of retransmissions.

For ease of understanding, retransmission of Msg5 is used as an example in Table 1 to show a meaning that may be represented by a TPC field in uplink grant. As shown in Table 1, different TPC commands in the first column may respectively indicate different transmit powers for Msg3 and a number of retransmissions of Msg5. The third column represents a number of retransmissions of Msg5 or an index corresponding to the number of retransmissions. The index may indicate different retransmission times.

TABLE 1

| TPC command | Power related factor value (dB) | Number of retransmissions of Msg5 or index |
| --- | --- | --- |
| 000 | −6 | 0 |
| 001 | −4 | 1 |
| 010 | −2 | 2 |
| 011 | 0 | 3 |
| 100 | 2 | 4 |
| 101 | 4 | 5 |

TABLE 1-continued

| TPC command | Power related factor value (dB) | Number of retransmissions of Msg5 or index |
|---|---|---|
| 110 | 6 | 6 |
| 111 | 8 | 7 |

Because correct receiving of the first PUCCH cannot be ensured in initial retransmission, the network device may further perform dynamic scheduling on retransmission of the first PUCCH by using DCI. The dynamic scheduling may include a number of retransmissions and an MCS level, so as to increase receiving performance for the first PUCCH and improve uplink coverage.

In some embodiments, the network device may alternatively indicate the number of retransmissions of the first PUCCH by using six bits in a TAC in Msg2. For example, a special bit in the six bits may be used to indicate a number of retransmissions of Msg5.

In some embodiments, the network device may configure a repetition factor related to the first PUCCH by using a SIB. For example, a repetition factor for PUCCH retransmission of HARQ-ACK for Msg4 may be added to SIB configuration information.

In a possible implementation, the repetition factor configured by using the SIB may be one or more repetition factors. If only one repetition factor is configured by using the SIB, the terminal device that supports PUCCH retransmission performs retransmission by using the repetition factor. A value of the repetition factor may be one of {1, 2, 4, 8}. If a plurality of repetition factors are configured by using the SIB, the network device may dynamically determine a PUCCH repetition performed by the terminal device. For example, the plurality of repetition factors configured by using the SIB may be {1, 2, 4, 8}. The repetition factors may alternatively be other integer values. In other words, when the repetition factor configured by the network device by using the SIB includes a plurality of parameter values, the number of retransmissions of the first PUCCH may be dynamically adjusted according to sorting of the plurality of parameter values.

For example, a system may indicate a sequence in which the plurality of repetition factors are progressively upgraded in ascending order. For example, when the plurality of repetition factors are respectively {1, 2, 4, 8}, if a repetition factor indicated for the first time is 1, after a failure, a repetition factor indicated for a next time is 2.

In some embodiments, the number of retransmissions of the first PUCCH may alternatively be determined by using a port number for the terminal device to send a DMRS. It may be learned from the foregoing description that the network device may configure indication information of different DMRS ports. The indication information may also include the number of PUCCH retransmissions configured by the network device. In other words, when the terminal device reports a capability of the terminal device by using a DMRS port number, the number of retransmissions of the first PUCCH is determined.

In some embodiments, the network device may indicate the number of retransmissions of the first PUCCH by using a DAI bit in DCI. The network device may perform indication by using a reserved DAI bit, or may configure a used DAI bit to include a meaning of indicating the number of PUCCH retransmissions. These DAIs may be applicable to different DCI formats. For example, the number of retransmissions of the first PUCCH may be indicated by using a DAI bit, sent by the network device, in a DCI format 1_0.

In a possible implementation, the network device may use two reserved DAI bits in the DCI format 1_0 scrambled by the TC-RNTI to indicate the number of retransmissions of the PUCCH of HARQ-ACK for Msg4. For example, the network device may reuse two reserved DAI bits in the PDCCH of Msg4, and the two reserved DAI bits use a DCI format 1_0 scrambled by the TC-RNTI. The two bits are allowed to indicate one of four possible transmissions, for example, one of 1, 2, 4, and 8.

In some embodiments, the network device may determine, based on different reasons sent by Msg3, different numbers of transmissions or whether retransmission is required. As described above, content of Msg3 may be different depending on different states and application scenarios of the terminal device. Msg3 includes an important information, namely, a unique identifier of each terminal device. The identifier may be used for subsequent contention resolution. As the third message in a random access procedure, Msg3 is described in following manners in different scenarios:

Scenario 1: RRCSetupRequest used in initial access in an RRC_IDLE state;
Scenario 2: RRCRequest used in access resuming in an RRC_INACTIVE state;
Scenario 3: RRCReestablishmentRequest used in RRC reestablishment;
Scenario 4: CRNTI used when uplink is out of synchronization, uplink data arrives, and downlink data arrives (in contention);
Scenario 5: RRCSystemInfoRequest used in another SI request; and
Scenario 6: CRNTI+RRCReconfigurationComplete used in handover (contention).

In a possible implementation, when the first PUCCH carries Msg5, the network device may determine, according to different sending scenarios of Msg3, whether retransmission of Msg5 is required. Table 2 is a possible implementation of indicating, by using a sending scenario of Msg3, whether retransmission of Msg5 is required. It should be noted that Table 2 is merely an example, and is not a limitation on a scenario. The network device may alternatively set whether retransmission of Msg5 is required in another scenario.

TABLE 2

| Scenario | Whether retransmission of Msg5 is required |
|---|---|
| RRCSetupRequest used in initial access in an RRC_IDLE state | Yes |
| RRCRequest used in access resuming in an RRC_INACTIVE state | No |
| RRCReestablishmentRequest used in RRC reestablishment | No |
| CRNTI used when uplink is out of synchronization, uplink data arrives, and downlink data arrives (in contention) | Yes |
| RRCSystemInfoRequest used in another SI request | No |
| CRNTI + RRCReconfigurationComplete used in handover (contention) | No |

In a possible implementation, in an NTN system, the network device may dynamically configure different retransmission factors depending on different reasons for sending Msg3. In other words, the number of retransmissions of the first PUCCH may be dynamically adjusted according to a scenario in which the terminal device sends Msg3. For example, when Msg3 is in initial access in the RRC_IDLE state, the number of retransmissions of the first PUCCH may be relatively large.

The foregoing describes a manner of determining and indicating the number of retransmissions of the first PUCCH in an embodiment of the present application. The first indication information may further include a resource for retransmissions of the first PUCCH. The following specifically describes how to determine a retransmission resource in an embodiment of the present application.

When it is determined that retransmission of the first PUCCH is needs to be performed, a retransmission resource may include a common PUCCH resource and a dedicated PUCCH resource of the terminal device. The common PUCCH resource generally belongs to a PUCCH resource indicated in a SIB1. In some embodiments, when the first PUCCH carries Msg5, whether the retransmission resource uses the common resource or the dedicated resource may be related to information carried in Msg4, or may be related to a behavior of the terminal device.

In a possible implementation, RRCSetup is not carried in Msg4, but only a contention resolution is carried. Since the dedicated PUCCH resource of the terminal device is in the RRCSetup, there may be no dedicated PUCCH resource when ACK is fed back. In this case, only a PUCCH resource indicated in SIB1 can be used.

In a possible implementation, if the RRCSetup and the contention resolution are in a same PDSCH, the retransmission resource of the first PUCCH may be determined based on the behavior of the terminal device. For example, if the terminal device has obtained the PUCCH resource through calculation when receiving DCI of Msg4, only the PUCCH resource indicated in SIB1 can be used in this case. For another example, if the terminal device determines that ACK needs to be fed back and the PUCCH resource is determined only one slot scheduling occasion earlier, a PUCCH resource indicated in the RRC Setup may have been obtained for a physical layer. Therefore, in this case, a dedicated PUCCH resource of the terminal device may be used to send retransmission of Msg5.

Common PUCCH resources corresponding to the retransmission resource may be some resources in SIB1. In some embodiments, in a case in which the terminal device has no dedicated resource, the retransmission resource for the first PUCCH may be determined by using one or more indexes in a PUCCH resource set provided in a protocol. In a possible implementation, if the terminal device does not have a dedicated PUCCH resource, the common PUCCH resource may be a resource corresponding to a first index range in the PUCCH resource set. The PUCCH resource set may be a PUCCH resource set specified in a related protocol and located before a dedicated PUCCH resource that is allocated. For example, the first index range may be a resource following index 10 in the resource set. The first index range may be specified in SIB1.

The number of retransmissions and the retransmission resource that are included in the first indication information are determined based on the first information. For a network device, whether it is a common PUCCH resource or a dedicated PUCCH resource, the number of retransmissions is determined based on a capability status of the terminal device, and a resource used for retransmission of ACK is further allocated based on the number of retransmissions and the retransmission resource.

The method embodiments of the present application are described in detail above with reference to FIG. 2 to FIG. 6.

The apparatus embodiments of the present application are described in detail below with reference to FIG. 7 to FIG. 9. It should be understood that the description of the apparatus embodiments corresponds to the description of the method embodiments, and therefore, for parts that are not described in detail, reference may be made to the foregoing method embodiments.

Figure 7:
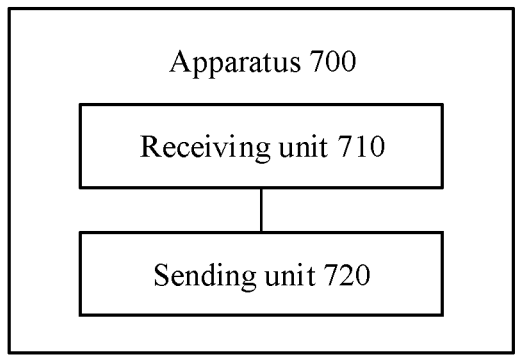
FIG. 7 is a schematic structural diagram of a wireless communications apparatus according to an embodiment of the present application.

FIG. 7 is a schematic block diagram of a wireless communications apparatus according to an embodiment of the present application. The apparatus may be any terminal device described above. The apparatus 700 shown in FIG. 7 includes a receiving unit 710 and a sending unit 720.

The receiving unit 710 may be configured to receive a first message of a random access procedure.

The sending unit 720 may be configured to perform retransmission of a first PUCCH based on first indication information of a network device, and the first PUCCH is used to carry feedback information corresponding to the first message. The first indication information is determined based on first information, and the first information is used to indicate whether the terminal device has a capability of repeatedly transmitting the first PUCCH.

Optionally, the first information is associated with one or more of the following information: a first preamble selected by the terminal device; channel quality detected by the terminal device; capability information, recorded by the network device, of the terminal device; and a port number for the terminal device to send a DMRS.

Optionally, the apparatus 700 further includes a selection unit, which may be configured to select the first preamble. The first preamble is a preamble, configured by the network device, in a first preamble group, and the first preamble group is used to indicate that the terminal device has the capability of repeatedly transmitting the first PUCCH. The sending unit 720 is further configured to send the first preamble.

Optionally, the first preamble group is determined based on one or more of the following preambles: a plurality of preambles corresponding to CBRA and sent by the network device; a plurality of preambles corresponding to CFRA and sent by the network device; and a plurality of preambles sent by the network device and being different from a preamble corresponding to CBRA or CFRA.

Optionally, the first preamble group is determined based on the plurality of preambles corresponding to the CBRA. In a case that the plurality of preambles corresponding to the CBRA include a preamble group A and a preamble group B, the first preamble group is determined based on the preamble group B. Alternatively, in a case that the plurality of preambles corresponding to the CBRA includes a preamble group A, the first preamble group is determined based on the preamble group A.

For example, a parameter corresponding to the first preamble group is configured by using ssb-perRACH-OccasionAndCB-PreamblesPerSSB.

Optionally, the first preamble group is determined based on the plurality of preambles corresponding to the CFRA or the plurality of preambles different from a preamble corresponding to CBRA or CFRA, and the first preamble group is configured in one of the following manners: separately configuring the first preamble group; configuring based on RACH-ConfigCommon; and configuring based on RACH-ConfigDedicated.

Optionally, when a number of consecutive failures of random access performed by the selecting unit by selecting the first preamble is greater than a first upper limit, the selecting unit is further configured to select a preamble, sent by the network device, in another preamble group.

Optionally, the first information is associated with the channel quality detected by the terminal device. The selecting unit is further configured to: when the channel quality is lower than a first threshold, select a second preamble, where the second preamble is used to request the network device to send the first indication information.

Optionally, the capability information of the terminal device includes whether the terminal device has a capability of repeatedly transmitting the first PUCCH, and the capability information is used by the network device to send the first indication information when the terminal device performs random access other than initial random access.

Optionally, the first indication information is used to determine one or more of the following information: a number of retransmissions of the first PUCCH; and a resource for retransmission of the first PUCCH.

Optionally, the number of retransmissions of the first PUCCH is indicated by using one or more of the following information: a CSI request bit, sent by the network device, in an uplink grant of an RAR; an MCS index bit, sent by the network device, in an uplink grant of an RAR; a TPC command bit, sent by the network device, in an uplink grant of an RAR; a TAC sent by network device; a repetition factor configured by the network device by using a SIB; a scenario in which the terminal device sends message 3; a DAI bit, sent by the network device, in a DCI format 10; and a port number for the terminal device to send a DMRS.

Optionally, the repetition factor configured by the network device by using the SIB includes a plurality of parameter values, and the number of retransmissions of the first PUCCH is dynamically adjusted according to an order of the plurality of parameter values.

Optionally, the number of retransmissions of the first PUCCH is dynamically adjusted in ascending order of the plurality of parameter values.

Optionally, the number of retransmissions of the first PUCCH is dynamically adjusted according to the scenario in which the terminal device sends message 3.

Optionally, the resource for retransmission of the first PUCCH includes a common PUCCH resource, and the common PUCCH resource is a resource, in a PUCCH resource set, corresponding to a first index range.

Figure 8:
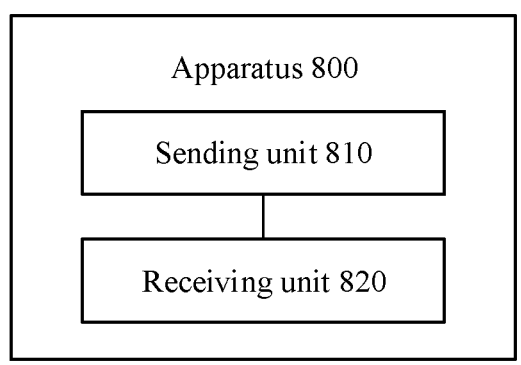
FIG. 8 is a schematic structural diagram of another wireless communications apparatus according to an embodiment of the present application.

FIG. 8 is a schematic block diagram of a wireless communications apparatus according to another embodiment of the present application. The apparatus may be any network device described above. The apparatus 800 shown in FIG. 8 includes a sending unit 810 and a receiving unit 820.

The sending unit 810 may be configured to send a first message in a random access procedure.

The receiving unit 820 may be configured to receive a first PUCCH repeatedly transmitted by a terminal device based on first indication information of the network device, and the first PUCCH is used to carry feedback information corresponding to the first message. The first indication information is determined based on first information, and the first information is used to indicate whether the terminal device has a capability of repeatedly transmitting the first PUCCH.

Optionally, the first information is associated with one or more of the following information: a first preamble selected by the terminal device; channel quality detected by the terminal device; capability information, recorded by the network device, of the terminal device; and a port number for the network device to send a DMRS.

Optionally, the receiving unit 820 may be further configured to receive a first preamble selected by the terminal device. The first preamble is a preamble, configured by the network device, in a first preamble group, and the first preamble group is used to indicate that the terminal device has the capability of repeatedly transmitting the first PUCCH.

Optionally, the first preamble group is determined based on one or more of the following preambles: a plurality of preambles corresponding to CBRA and sent by the network device; a plurality of preambles corresponding to CFRA and sent by the network device; and a plurality of preambles sent by the network device and being different from a preamble corresponding to CBRA or CFRA.

Optionally, the first preamble group is determined based on the plurality of preambles corresponding to the CBRA. In a case that the plurality of preambles corresponding to the CBRA include a preamble group A and a preamble group B, the first preamble group is determined based on the preamble group B. Alternatively, in a case that the plurality of preambles corresponding to the CBRA includes a preamble group A, the first preamble group is determined based on the preamble group A.

For example, a parameter corresponding to the first preamble group is configured by using ssb-perRACH-OccasionAndCB-PreamblesPerSSB.

Optionally, the first preamble group is determined based on the plurality of preambles corresponding to the CFRA or the plurality of preambles different from a preamble corresponding to CBRA or CFRA, and the first preamble group is configured in one of the following manners: separately configuring the first preamble group; configuring based on RACH-ConfigCommon; and configuring based on RACH-ConfigDedicated.

Optionally, the first information is associated with the channel quality detected by the terminal device. The receiving unit 820 is further configured to: when the channel quality is lower than a first threshold, receive a second preamble selected by the terminal device, and the second preamble is used to request the network device to transmit the first indication information.

Optionally, the capability information of the terminal device includes whether the terminal device has the capability of repeatedly transmitting the first PUCCH, and the capability information is used by the network device to send the first indication information when the terminal device performs random access other than initial random access.

Optionally, the first indication information is used to determine one or more of the following information: a number of retransmissions of the first PUCCH; and a resource for retransmission of the first PUCCH.

Optionally, the number of retransmissions of the first PUCCH is indicated by using one or more of the following information: a CSI request bit, sent by the network device, in an uplink grant of an RAR; an MCS index bit, sent by the network device, in an uplink grant of an RAR; a TPC command bit, sent by the network device, in an uplink grant of an RAR; a TAC sent by network device; a repetition factor configured by the network device by using a SIB; a scenario in which the terminal device sends message 3; and a DAI bit, sent by the network device, in a DCI format 10; and a port number for the terminal device to send a DMRS.

Optionally, the repetition factor configured by the network device by using the SIB includes a plurality of parameter values, and the number of retransmissions of the first PUCCH is dynamically adjusted according to an order of the plurality of parameter values.

Optionally, the number of retransmissions of the first PUCCH is dynamically adjusted in ascending order of the plurality of parameter values.

Optionally, the number of retransmissions of the first PUCCH is dynamically adjusted according to the scenario in which the terminal device sends message 3.

Optionally, the resource for retransmission of the first PUCCH includes a common PUCCH resource, and the common PUCCH resource is a resource, in a PUCCH resource set, corresponding to a first index range.

Figure 9:
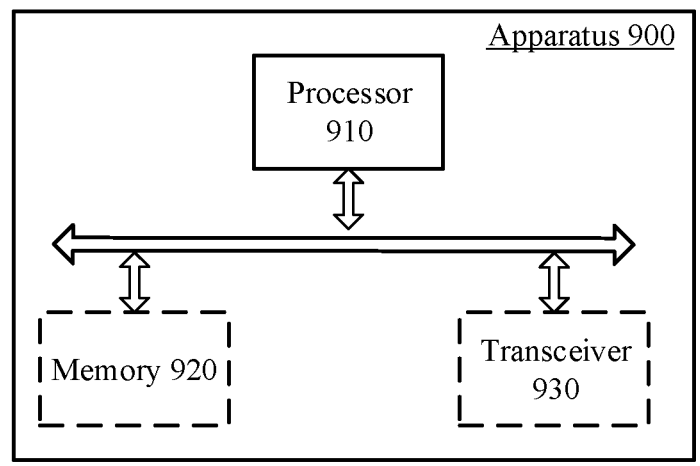
FIG. 9 is a schematic structural diagram of a communications apparatus according to an embodiment of the present application.

FIG. 9 is a schematic structural diagram of a communications apparatus according to an embodiment of the present application. The dashed lines in FIG. 9 indicate that the unit or module is optional. The apparatus 900 may be configured to implement the methods described in the foregoing method embodiments. The apparatus 900 may be a chip, a terminal device, or a network device.

The apparatus 900 may include one or more processors 910. The processor 910 may allow the apparatus 900 to implement the methods described in the foregoing method embodiments. The processor 910 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 900 may further include one or more memories 920. The memory 920 stores a program that may be executed by the processor 910 to cause the processor 910 to perform the methods described in the foregoing method embodiments. The memory 920 may be independent of the processor 910 or may be integrated into the processor 910.

The apparatus 900 may further include a transceiver 930. The processor 910 may communicate with another device or chip through the transceiver 930. For example, the processor 910 may send and receive data to and from another device or chip through the transceiver 930.

An embodiment of the present application further provides a computer-readable storage medium for storing a program. The computer-readable storage medium may be applied to the terminal device or the network device provided in the embodiments of the present application, and the program causes a computer to perform the methods to be performed by the terminal device or the network device in various embodiments of the present application.

It should be understood that the computer-readable storage medium mentioned in this embodiment of the present application may be any usable medium readable by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of the present application further provides a computer program product. The computer program product includes a program. The computer program product may be applied to the terminal device or the network device provided in the embodiments of the present application, and the program causes a computer to perform the methods to be performed by the terminal device or the network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner.

An embodiment of the present application further provides a computer program. The computer program product may be applied to the terminal device or the network device provided in the embodiments of the present application, and the computer program causes a computer to perform the methods to be performed by the terminal device or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, the term "corresponding" may mean that there is a direct or indirect correspondence between the two, or may mean that there is an association relationship between the two, or may mean that there is a relationship such as indicating and being indicated, or configuring and being configured.

In the embodiments of the present application, "pre-configured" may be implemented by pre-storing corresponding codes, tables, or other forms that can be used to indicate related information in devices (for example, including the terminal device and the network device), and a specific implementation thereof is not limited in the present application.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, determining B based on A does not mean determining B based only on A, but instead B may be determined based on A and/or other information.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
receiving, from a network device, at least one downlink assignment index (DAI) bit in a downlink control information (DCI) format 1_0, wherein the network device is a non-terrestrial network (NTN) network device;
receiving, by a terminal device, a msg4 message in a random access procedure; and
performing, by the terminal device, retransmission of feedback information corresponding to the msg4 message based on the DAI bit and whether the terminal device has a capability of repeatedly transmitting feedback information of the msg4 message in the random access procedure, wherein the at least one DAI bit indicates a number of retransmissions of feedback information of the msg4 message, wherein the retransmission of feedback information corresponding to the msg4 message in the random access procedure is performed based on a reference signal received power (RSRP) threshold for PUCCH repetition, wherein the RSRP threshold for PUCCH repetition is received in a broadcast signal.

2. The method according to claim 1, wherein the retransmission is performed further based on one or more of the following information:
a first preamble selected by the terminal device;
channel quality detected by the terminal device; or
a port number for the terminal device to send a demodulation reference signal (DMRS).

3. The method according to claim 2, wherein the retransmission is associated with the first preamble, and before the receiving, by the terminal device, the msg4 message in the random access procedure, the method further comprises:
selecting, by the terminal device, the first preamble, wherein the first preamble is a preamble, configured by a network device, in a first preamble group, and the first preamble group is used for terminal devices having the capability of repeatedly transmitting the feedback information of the msg4 message in the random access procedure; and
sending, by the terminal device, the first preamble.

4. The method according to claim 3, wherein the first preamble group is determined based on one or more of the following preambles:
a plurality of preambles corresponding to contention-based random access (CBRA) sent by the network device;
a plurality of preambles corresponding to contention-free random access (CFRA) sent by the network device; or
a plurality of preambles sent by the network device and being different from a preamble corresponding to CBRA or CFRA.

5. The method according to claim 4, wherein the first preamble group is determined based on the plurality of preambles corresponding to the CBRA; and
in a case that the plurality of preambles corresponding to the CBRA comprise a preamble group A and a preamble group B, the first preamble group is determined based on the preamble group B; or
in a case that the plurality of preambles corresponding to the CBRA comprises a preamble group A, the first preamble group is determined based on the preamble group A.

6. The method according to claim 5, wherein a parameter corresponding to the first preamble group is configured by using ssb-perRACH-OccasionAndCB-PreamblesPerSSB.

7. The method according to claim 4, wherein the first preamble group is determined based on the plurality of preambles corresponding to the CFRA or the plurality of preambles different from a preamble corresponding to CBRA or CFRA, and the first preamble group is configured in one of the following manners:
separately configuring the first preamble group;
configuring based on RACH-ConfigCommon; or
configuring based on RACH-ConfigDedicated.

8. The method according to claim 3, wherein the method further comprises:

when a number of consecutive failures of random access performed by the terminal device by selecting the first preamble is greater than a first threshold, selecting, by the terminal device, a preamble in another preamble group.

9. The method according to claim 1, further comprising: receiving a resource for retransmission of the feedback information of the msg4 message.

10. The method according to claim 9, wherein the resource for retransmission of the feedback information of the msg4 message comprises a common PUCCH resource, and the common PUCCH resource is a resource in a PUCCH resource set, wherein the PUCCH resource set corresponds to a first index range.

11. A wireless communication method, comprising:
sending, by a network device, at least one downlink assignment index (DAI) bit in a downlink control information (DCI) format 1_0, wherein the DAI bit indicates a number of retransmissions of feedback information of a msg4 message in a random access procedure wherein the network device is a non-terrestrial network (NTN) network device;
sending, by the network device, the msg4 message in the random access procedure; and
receiving, by the network device and from a terminal device, a retransmission feedback information corresponding to the msg4 message, and the retransmission is performed based on the DAI bit and whether the terminal device has a capability of repeatedly transmitting feedback information of the msg4 message in the random access procedure and the DAI bit, wherein the at least one DAI bit indicates a number of retransmissions of feedback information of the msg4 message, wherein the retransmission of feedback information corresponding to the msg4 message in the random access procedure is performed based on a reference signal received power (RSRP) threshold for PUCCH repetition, wherein the RSRP threshold for PUCCH repetition is received in a broadcast signal.

12. A terminal device, comprising:
at least one processor; and
one or more memories coupled to the at least one processor and storing programming instructions for execution by the at least one processor to cause the terminal device to perform operations comprising:
receiving, from a network device, at least one downlink assignment index (DAI) bit in a downlink control information (DCI) format 1_0, wherein the network device is a non-terrestrial network (NTN) network device;
receiving a msg4 message in a random access procedure; and
performing retransmission of feedback information corresponding to the msg4 message based on the DAI bit and whether the terminal device has a capability of repeatedly transmitting feedback information of the msg4 message in the random access procedure, wherein the at least one DAI bit indicates a number of retransmissions of feedback information of the msg4 message, wherein the retransmission of feedback information corresponding to the msg4 message in the random access procedure is performed based on a reference signal received power (RSRP) threshold for PUCCH repetition, wherein the RSRP threshold for PUCCH repetition is received in a broadcast signal.

13. The terminal device according to claim 12, wherein retransmission is performed further based on one or more of the following information:
a first preamble selected by the terminal device;
channel quality detected by the terminal device; or
a port number for the terminal device to send a demodulation reference signal (DMRS).

\* \* \* \* \*